(12) United States Patent
Wang

(10) Patent No.: US 8,873,427 B2
(45) Date of Patent: Oct. 28, 2014

(54) METHOD FOR ESTABLISHING TOPOLOGY STRUCTURE OF SWITCHING EQUIPMENT, SWITCHING EQUIPMENT AND STACKING SYSTEM

(75) Inventor: Xuan Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 348 days.

(21) Appl. No.: 13/390,283

(22) PCT Filed: Jun. 10, 2010

(86) PCT No.: PCT/CN2010/073761
§ 371 (c)(1),
(2), (4) Date: Feb. 13, 2012

(87) PCT Pub. No.: WO2011/017972
PCT Pub. Date: Feb. 17, 2011

(65) Prior Publication Data
US 2012/0147785 A1 Jun. 14, 2012

(30) Foreign Application Priority Data

Aug. 13, 2009 (CN) .......................... 2009 1 0090486

(51) Int. Cl.
| | | |
|---|---|---|
| H04L 12/28 | (2006.01) | |
| H04L 12/26 | (2006.01) | |
| H04W 4/00 | (2009.01) | |
| H04L 12/701 | (2013.01) | |
| H04L 12/24 | (2006.01) | |
| H04L 12/939 | (2013.01) | |
| H04L 12/931 | (2013.01) | |

(52) U.S. Cl.
CPC .............. *H04L 49/555* (2013.01); *H04L 45/00* (2013.01); *H04L 41/12* (2013.01); *H04L 49/40* (2013.01)
USPC ........... 370/254; 370/252; 370/328; 370/392; 370/400

(58) Field of Classification Search
CPC ...................................................... H04L 41/12
USPC .................................. 370/254, 328, 392, 400
See application file for complete search history.

(56) References Cited

U.S. PATENT DOCUMENTS

| | | | | |
|---|---|---|---|---|
| 2003/0021273 | A1* | 1/2003 | Fouquet et al. | 370/392 |
| 2005/0152376 | A1* | 7/2005 | Itoh | 370/400 |
| 2006/0092853 | A1* | 5/2006 | Santoso et al. | 370/252 |
| 2008/0080416 | A1* | 4/2008 | Park et al. | 370/328 |

FOREIGN PATENT DOCUMENTS

| | | |
|---|---|---|
| CN | 101141404 A | 3/2008 |
| CN | 101170483 A | 4/2008 |
| CN | 101621466 A | 1/2010 |

* cited by examiner

*Primary Examiner* — Ian Moore
*Assistant Examiner* — Kiet Tang
(74) *Attorney, Agent, or Firm* — McGarry Bair PC

(57) ABSTRACT

In the invention, a method for establishing topology structure of switching equipments, a switching equipment and a stacking system are provided. The invention relates to the field of stacking systems in data communication, and the problem of a topology discovery error caused by different starting times of switching equipments is solved. The method comprises the following steps: Step 1, when any one of the following two requirements is met, the switching equipment turns to Step 2, otherwise, the switching equipment executes the Step 1 again, wherein the first one of the two requirements is that the current time exceeds a predetermined time, which is the time for the initialization of all the switching equipments in the stacking system; and the second one of the two requirements is that the switching equipment receives a topology discovery message from another switching equipment in the stacking system; Step 2, the switching equipment sends topology discovery messages to all the other switching equipments in the stacking system; and Step 3, the switching equipment performs a topology discovery. The invention can be applied to a stacking system where switching equipments have different starting times.

7 Claims, 5 Drawing Sheets

METHOD FOR ESTABLISHING TOPOLOGY STRUCTURE OF SWITCHING EQUIPMENT, SWITCHING EQUIPMENT AND STACKING SYSTEM

CROSS-REFERENCE TO RELATED APPLICATIONS

This application is a National Phase application of International Application No. PCT/CN2010/073761, filed Jun. 10, 2010, which claims the benefit of Chinese Patent Application No. 200910090486.1, filed Aug. 13, 2009, both of which are incorporated herein by reference in their entirety.

FIELD OF THE INVENTION

The present invention relates to the field of stacking system in data communication, and in particular to a method for establishing topology structure of switching equipments, a switching equipment and a stacking system.

BACKGROUND OF THE INVENTION

With the continuous development of Internet technology, the demands for high-throughput data exchange and various intelligent applications are increasing, and the requirements for the overall bandwidth of a network become higher and higher. In general, data switching equipments are stacked in a large network in order to meet the requirement of the large network on port number and to realize a uniform management on the data switching equipments. The users can connect a plurality of switch equipments together with stacking ports and stacking lines to form an annular or link-shaped stacking system.

In a stacking system, each switching equipment (Unit) needs a unique identifier, which refers generally to the Media Access Control (MAC) address of the switching equipment. The main purpose of a stacked topology discovery is to form an address mapping table among switching equipments and elect a master device (master unit) for managing switching equipments and a slave device (slave unit) for replacing the master device when the master device exits because of anomaly.

At present, all stacking systems adopt the principle of state machine to realize a topology discovery using the following two main methods:

Method 1: the MAC of every unit is written into the Flash memory of each unit, and then all the units are started. During a topology discovery process, each unit sends topology discovery messages carrying MAC addresses and identifier items to the other units, wherein the identifier items are generated by taking local clock values as input parameters. After receiving the topology discovery message, each unit establishes a neighborhood relationship and elects a master unit and a slave unit according to the MAC and the identifier item. At last, the master unit performs a topological calculation and sends a topology message to realize a convergence to form an address mapping table among the units.

Method 2: the MAC and the priority of each unit are written into the Flash memory of the unit, wherein the MAC of each unit in a stacking system is required to be unique, and then all the units are started. Each unit sends topology discovery messages carrying MAC addresses, priorities and the information of stacking ports to the other units, acquires the MAC addresses and the priorities of the other units from topology discovery messages received from the other units, generates new stacked topology discovery messages according to the information of the stacking ports and the MAC addresses of the other units, and sends the new stacked topology discovery messages to the other units to establish neighborhood relationship. Then, the unit elects a master unit and a slave unit according to the MAC addresses and the priorities. At last, the master unit performs a topological calculation and sends a topology message to realize a convergence to form an address mapping table among the units.

The premise of the two topology discovery methods for a stacking system is that all the units in the stacking system are synchronously initialized. However, the types of units in a stacking system may be different, so the initialization times of the units may be different, leading to a topology discovery error. As a consequence, the unit desired to be a master uint cannot be elected a master unit due to an overlong initialization time, leading to an error master unit election and an error slave unit election.

SUMMARY OF THE INVENTION

A method for establishing topology structure of switching equipments, a switching equipment and a stacking system are provided, which are capable of solving the problem of a topology discovery error caused by different starting times of switching equipments.

In order to solve the above technical problem, the technical solution provided in embodiments of the present invention is as follows:

in accordance with an aspect of the present invention, a method for establishing topology structure of switching equipments in a stacking system is provided, wherein the method comprises the following steps:

Step 1, when any one of the following two requirements is met, turning to Step 2 by the switching equipment, otherwise, executes the Step 1 again by the switching equipment, wherein the first one of the two requirements is that the current time exceeds a predetermined time, which is the time for the initialization of all the switching equipments in the stacking system, and the second one of the two requirements is that the switching equipment receives a topology discovery message from another switching equipment in the stacking system;

Step 2, sending, by the switching equipment, topology discovery messages to all the other switching equipments in the stacking system; and Step 3, performing a topology discovery by the switching equipment.

In the method, Step 1 further comprises the steps of:

determining, by the switching equipment, whether or not the time difference between the current time and the initialization time of the switching equipment exceeds the predetermined time and generating a first determination result, wherein the predetermined time is the time for the initialization of all the switching equipments in the stacking system;

if the first determination result is that the time difference between the current time and the initialization time of the switching equipment exceeds the predetermined time, turning to Step 2 by the switching equipment, otherwise, determining, by the switching equipment, whether or not there is a topology discovery message received from another switching equipment in the stacking system and generating a second determination result;

if the second determination result is that there is a topology discovery message received from another switching equipment in the stacking system, turning to Step 2 by the switching equipment, otherwise, executing Step 1 again by the switching equipment.

In the method, Step 1 comprises the steps of:

determining, by the switching equipment, whether or not there is a topology discovery message received from another switching equipment in the stacking system and generating a second determination result;

if the second determination result is that there is a topology discovery message received from another switching equipment in the stacking system, turning to Step 2 by the switching equipment, otherwise, determining, by the switching equipment, whether or not the time difference between the current time and the initialization time of the switching equipment exceeds the predetermined time and generates a first determination result, wherein the predetermined time is the time for the initialization of all the switching equipments in the stacking system;

if the first determination result is that the time difference between the current time and the initialization time of the switching equipment exceeds the predetermined time, turning to Step 2 by the switching equipment, otherwise, executing Step 1 again by the switching equipment.

In the method, the Step that the switch device performs a topology discovery comprises the steps of:

establishing, by the switching equipment, a neighborhood relationship with the other switching equipments;

electing, by the switching equipment, a master device in the stacking system;

electing, by the switching equipment, a slave device in the stacking system; and performing, by the switching equipment, a topological calculation.

In the method, the predetermined time is longer than or as long as the time difference between the longest time for the initialization of all the switching equipments in the stacking system and the initialization time of the switching equipment.

In the method, the predetermined time is ranged from 10 s to 20 s.

In accordance with another aspect, a switching equipment is provided, comprising:

a determination unit, which is used for determining whether or not the switching equipment meets any one of the following two requirements, wherein the first one of the two requirements is that the current time exceeds a predetermined time, which is the time for the initialization of all the switching equipments in the stacking system, and the second one of the two requirements is that the switching equipment receives a topology discovery message from another switching equipment in the stacking system;

a sending unit, which is used for sending topology discovery messages to all the other switching equipments in the stacking system if any one of the two requirements is met; and a topology discovery unit, which is used for performing a topology discovery.

In the switching equipment, the determination unit comprises:

a first determination sub-unit, which is used for determining whether or not the time difference between the current time and the initialization time of the switching equipment exceeds the predetermined time and generating a first determination result, wherein the predetermined time is the time for the initialization of all the switching equipments in the stacking system, and starting the sending unit if the first determination result is that the time difference between the current time and the initialization time of the switching equipment exceeds the predetermined time; and a second determination sub-unit, which is used for determining whether or not there is a topology discovery message received from another switching equipment in the stacking system if the first determination result is that the time difference between the current time and the initialization time of the switching equipment fails to exceed the predetermined time, generating a second determination result, starting the sending unit if there is a topology discovery message received from another switching equipment in the stacking system, and starting the first determination sub-unit if there is no topology discovery message received from another switching equipment in the stacking system;

or the determination unit comprises:

a third determination sub-unit, which is used for determining whether or not there is a topology discovery message received from another switching equipment in the stacking system, generating a second determination result, and starting the sending unit if the second determination result is that there is a topology discovery message received from another switching equipment in the stacking system; and a fourth determination sub-unit, which is used for determining whether or not the time difference between the current time and the initialization time of the switching equipment exceeds the predetermined time if the second determination result is that there is no topology discovery message received from another switching equipment in the stacking system, generating a first determination result, wherein the predetermined time is the time for the initialization of all the switching equipments in the stacking system, starting the sending unit if the first determination result is that the time difference between the current time and the initialization time of the switching equipment exceeds the predetermined time, and starting the third determination sub-unit if the first determination result is that the time difference between the current time and the initialization time of the switching equipment fails to exceed the predetermined time.

In the switching equipment, the predetermined time is longer than or as long as the time difference between the longest time for the initialization of all the switching equipments in the stacking system and the initialization time of the switching equipment In accordance with still another aspect of the present invention, a stacking system comprising at least two switching equipments is provided, wherein the switching equipment comprises:

a determination unit, which is used for determining whether or not the switching equipment meets any one of the following two requirements, wherein the first one of the two requirements is that the current time exceeds a predetermined time, which is the time for the initialization of all the switching equipments in the stacking system; and the second one of the two requirements is that the switching equipment receives a topology discovery message from another switching equipment in the stacking system;

a sending unit, which is used for sending topology discovery messages to all the other switching equipments in the stacking system if any one of the two requirements is met; and a topology discovery unit, which is used for performing a topology discovery.

The embodiments of the present invention have the following beneficial effects:

in the aforementioned solution, during the establishment process of topology structure, the switching equipment in the stacking system needing the shortest starting time is the one that enters into a topology discovery state first, and after entering into the topology discovery state, the switching equipment sends topology discovery messages to the other switching equipments; and the other switching equipments also enter into the topology discovery state after receiving the topology discovery messages. In this way, it is guaranteed that all the switching equipments in the stacking system can be found in time, so all the switching equipments in the system can perform topology discoveries at highly close times. Thus, the topology discovery error caused by different starting times of the switching equipments in the stacking system is avoided.

DETAILED DESCRIPTION OF EMBODIMENTS

For the sake of a better understanding of the technical problem to be solved by the embodiments of the present invention, the technical solution and the advantages of the present invention, the present invention is described below in detail by reference to the drawings in conjunction with specific embodiments.

According to the embodiments in the present invention, on account of the problem existing in the related art that a stacking system cannot perform topology discovery correctly as the switching equipments in the stack system are initialized at different times, a method for establishing topology structure of switching equipments, a switching equipment and a stacking system are provided.

Figure 1:
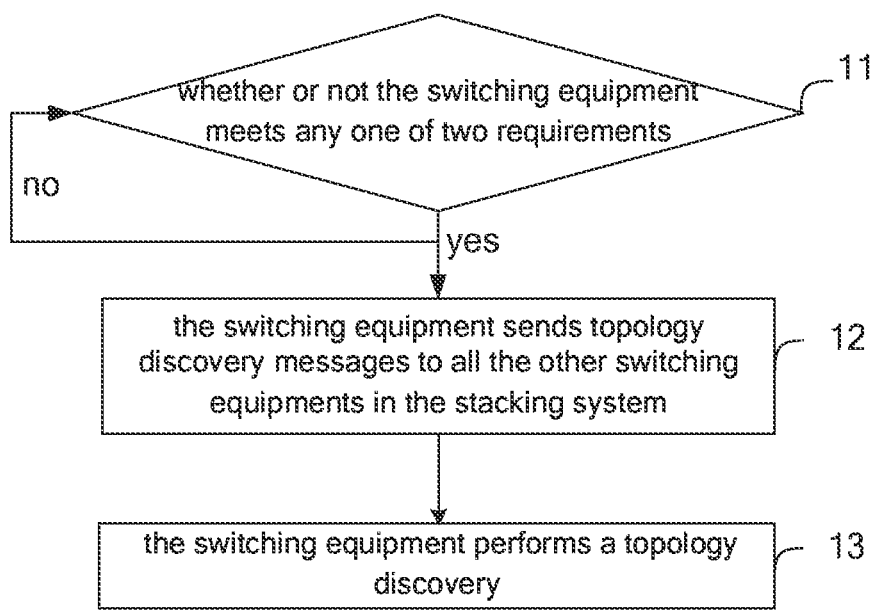
FIG. 1 is a schematic diagram illustrating the flow of an embodiment of the method provided in the present invention for establishing topology structure of switching equipments in a stacking system.

As shown in FIG. 1, an embodiment of the method provided in the present invention for establishing topology structure of switching equipments comprises the following steps:

Step 11: when any one of the following two requirements is met, the switching equipment turns to Step 12, otherwise, the switching equipment executes the Step 11 again, wherein the first one of the two requirements is that the current time exceeds a predetermined time, which is the time for the initialization of all the switching equipments in the stacking system, and the second one of the two requirements is that the switching equipment receives a topology discovery message from another switching equipment in the stacking system;

Step 12, the switching equipment sends topology discovery messages to all the other switching equipments in the stacking system; and Step 13, the switching equipment performs a topology discovery.

In the related art, after initialized, the switching equipments in a stacking system performs topology discoveries. In the above solution, during the establishment process of topology structure, the switching equipment in the stacking system needing the shortest starting time is the one that enters into a topology discovery state first, and after entering into the topology discovery state, the switching equipment sends topology discovery messages to the other switching equipments; and the other switching equipments also enter into the topology discovery state after receiving the topology discovery messages. In this way, it is guaranteed that all the switching equipments in the stacking system can be found in time, so all the switching equipments in the system can perform topology discoveries at highly close times. Thus, the topology discovery error caused by different starting times of the switching equipments in the stacking system is avoided.

In the method, the step that the switching equipment performs a topology discovery comprises the following steps that:

the switching equipment establishes a neighborhood relationship with the other switching equipments;

the switching equipment elects a master device in the stacking system;

the switching equipment elects a slave device in the stacking system; and the switching equipment performs a topological calculation.

The predetermined time can be set according to the time for the initialization of all the switching equipments in the stacking system. The predetermined time is longer than or as long as the time difference between the longest time for the initialization of all the switching equipments in the stacking system and the initialization time of the switching equipment. Optionally, in order to realize the method in a simple way, the predetermined time is set to be longer than or as long as the longest time for the initialization of all the switching equipments in the stacking system. Optionally, the predetermined time is ranged from 10 s to 20 s.

In the solution above, if the switching equipment is the one needing the shortest starting time, the switching equipment enters into a topology discovery state first and sends topology discovery messages to the other switching equipments to enable the other switching equipments to enter into the topology discovery state. If the switching equipment needs a long starting time, the switching equipment enters into a topology discovery state after receiving a topology discovery message from another switching equipment, and then establishes topology structure with the other devices and elects a master device, a slave device and so on in the stacking system.

Figure 2:
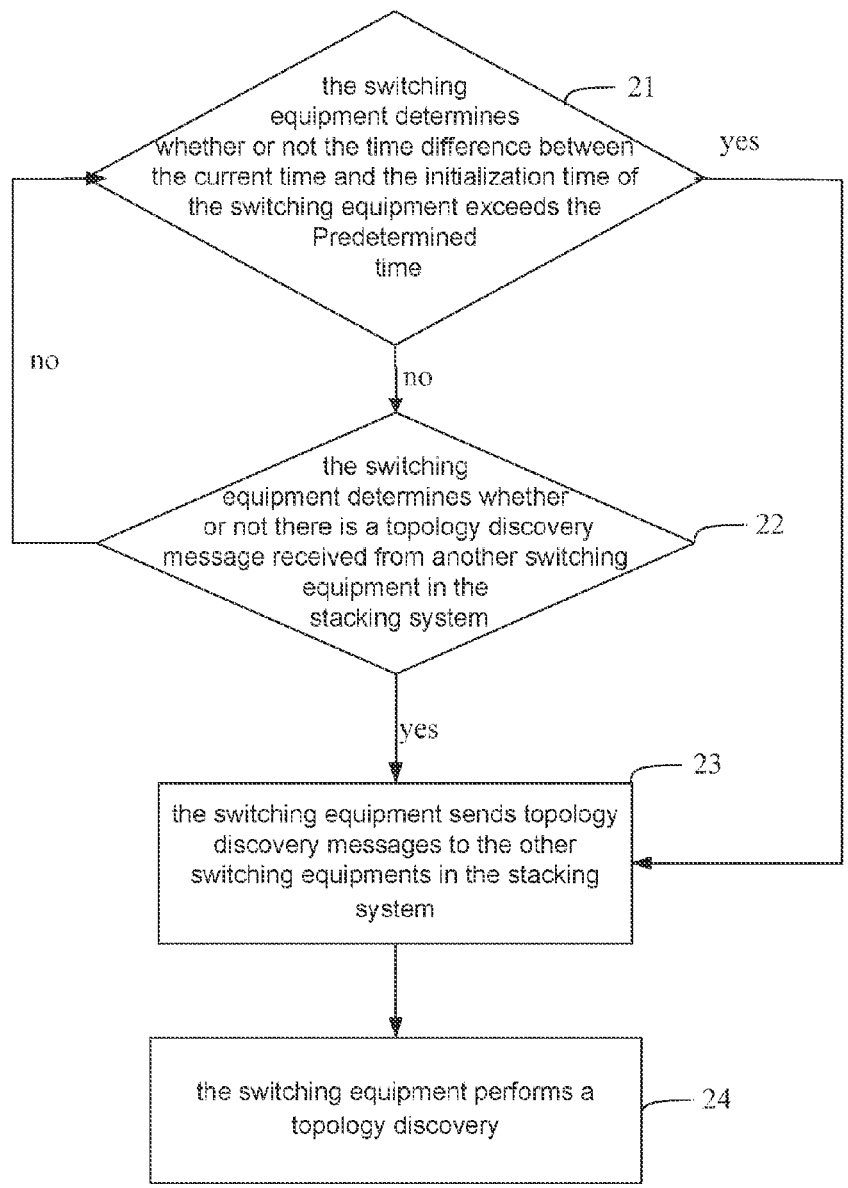
FIG. 2 is a schematic diagram illustrating the flow of another embodiment of the method provided in the present invention for establishing topology structure of switching equipments in a stacking system.

As shown in FIG. 2, another embodiment of the method provided in the present invention for establishing topology structure of switching equipments comprises the following steps:

Steps 21: the switching equipment determines whether or not the time difference between the current time and the initialization time of the switching equipment exceeds the predetermined time and generates a first determination result, wherein the predetermined time is the time for the initialization of all the switching equipments in the stacking system; if the first determination result is that the time difference between the current time and the initialization time of the switching equipment exceeds the predetermined time, the switching equipment turns to Step 23, otherwise, the switching equipment executes the following Step 22;

Step 22: the switching equipment determines whether or not there is a topology discovery message received from another switching equipment in the stacking system and generates a second determination result; if the second determination result is that there is a topology discovery message received from another switching equipment in the stacking system, the switching equipment turns to Step 23, otherwise, the switching equipment executes Step 21 again;

Step 23: the switching equipment sends topology discovery messages to the other switching equipments in the stacking system; and Step 24: the switching equipment performs a topology discovery.

Figure 3:
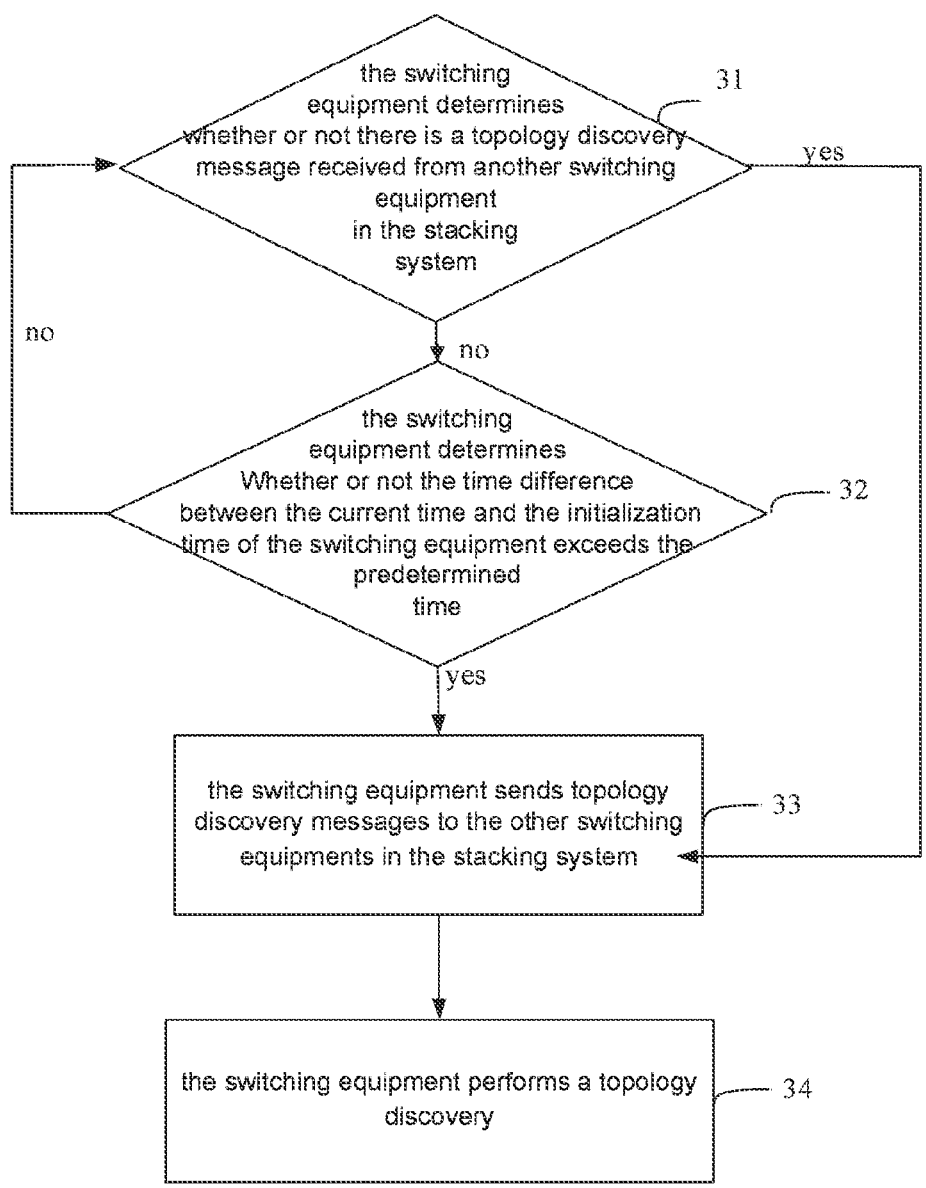
FIG. 3 is a schematic diagram illustrating the flow of still another embodiment of the method provided in the present invention for establishing topology structure of switching equipments in a stacking system.

As shown in FIG. 3, another embodiment of the method provided in the present invention for establishing topology structure of switching equipments comprises the following steps:

Step 31: the switching equipment determines whether or not there is a topology discovery message received from another switching equipment in the stacking system and generates a second determination result; if the second determination result is that there is a topology discovery message received from another switching equipment in the stacking system, the switching equipment turns to Step 33, otherwise, the switching equipment turns to Step 32;

Step 32: the switching equipment determines whether or not the time difference between the current time and the initialization time of the switching equipment exceeds the predetermined time and generates a first determination result, wherein the predetermined time is the time for the initialization of all the switching equipments in the stacking system; if the first determination result is that the time difference between the current time and the initialization time of the switching equipment exceeds the predetermined time, the switching equipment turns to Step 33, otherwise, the switching equipment executes Step 31 again;

Step 33: the switching equipment sends topology discovery messages to the other switching equipments in the stacking system; and Step 34: the switching equipment performs a topology discovery.

Figure 4:
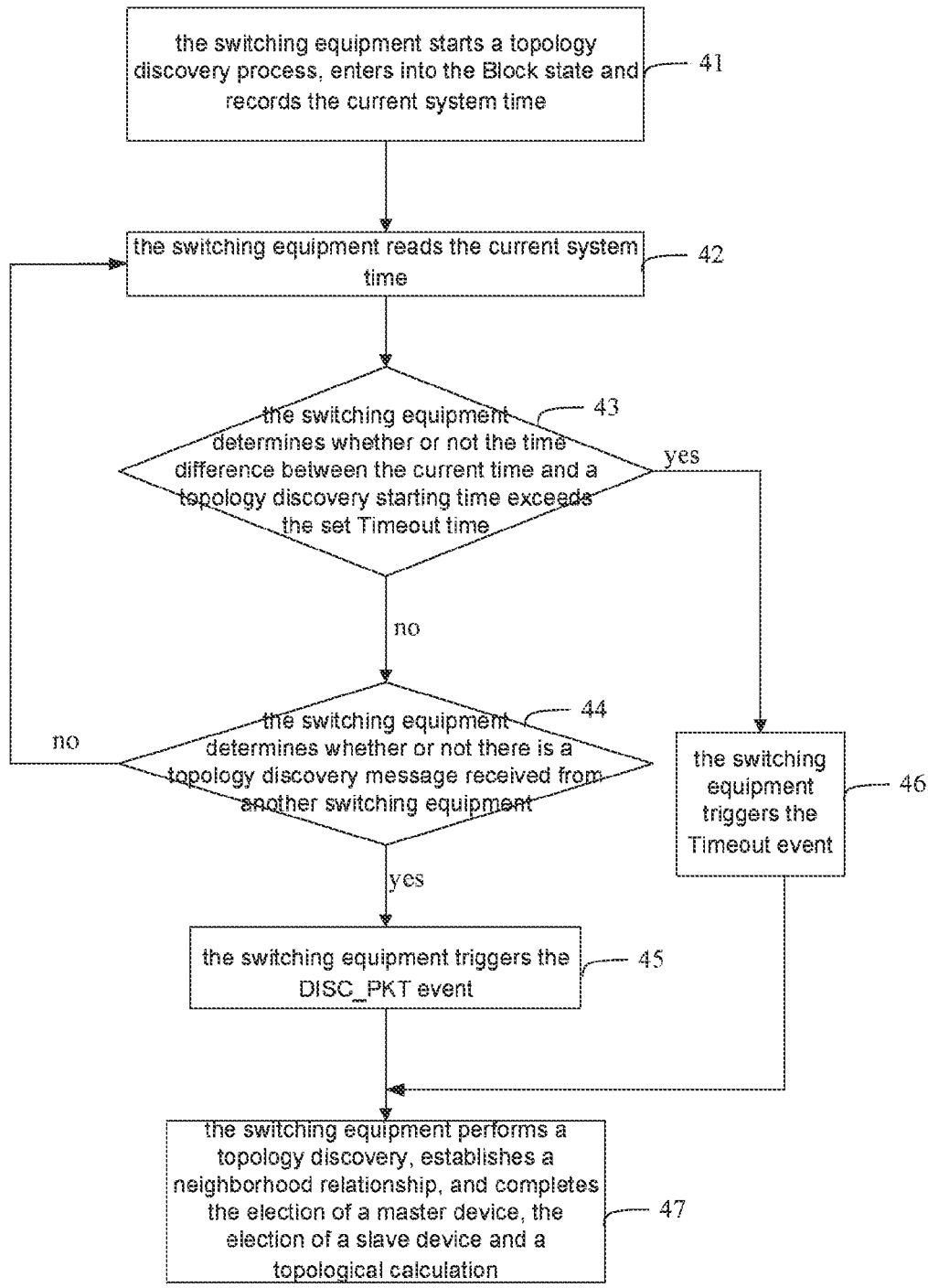
FIG. 4 is a schematic diagram illustrating the flow of an application of the method provided in the present invention for establishing topology structure of switching equipments in a stacking system.

As shown in FIG. 4, an application of the method provided in the invention is described below.

In the present invention, a Block state, a Disc (topology discovery) state, a Timeout event and a DISK_PKT (topology discovery message reception) event are added in a state machine for a stacked topology discovery.

Step 41: after initialized, the switching equipment starts a topology discovery process, sets the stacked topology state machine to be in the Block state, enters into the Block state, records the current system time, and waits for the Timeout event, wherein the Timeout event can be realized by a timer;

Step 42: the switching equipment reads the current system time;

Step 43: the switching equipment calculates the time difference between the current system time and a topology discovery start time, determines whether or not the time difference exceeds the set Timeout time. If so, turns to Step 45, otherwise, executes Step 44;

Step 44: the switching equipment determines whether or not there is a topology discovery message received from another unit. If so, executes Step 45, otherwise, turns to Step 42;

Step 45: the switching equipment triggers the DISC_PKT event, enters into the Disc state, and turns to Step 47;

Step 46: the switching equipment triggers the Timeout event, enters into the Disc state, and turns to Step 47; and Step 47: the switching equipment performs a topology discovery, establishes a neighborhood relationship, and completes the election of a master device, the election of a slave device and a topological calculation.

In this case, the Timeout time, which is determined according to the time difference among the initialization times needed by the switching equipments of all types constituting the stacking system, is generally set to be 10 s-20 s to guarantee that the switching equipments of all the types in the stacking system can be initialized and enter into the Block state. The initialization time of a switching equipment is mainly determined according to the following aspects:

1, the type of the switching equipment: as a switching equipment of a different type is composed of different hardware, when the equipment is being initialized, the mounting of a Peripheral Component Interconnect (PCI) chip, the initialization of a physical layer (PHY) chip and the flow of a board support package (BSP) are different, which makes the initialization times of the different types of switching equipments different;

2, the number of the switching chips in the switching equipment: the more switching chips a switching equipment has, the more working the equipment needs to do to be initialized, and the longer the initialization time will be. Accordingly, the initialization times needed by equipments with different numbers of switching chips are significantly different;

3, the production technique of the switching equipment: as the techniques used in producing different batches of switching equipments may be slightly different, the initialization times needed by the switching equipments may be slightly different.

As overlong Timeout time will undermine the starting performance of the stacking system, so the Timeout time is required to be as short as possible. Considering the three situations above, the Timeout time is typically set to be 5 s-10 s in the case where switching equipments with different numbers of switching chips cannot constitute a stacking system and 15 s-20 s in other cases.

In embodiments of the present invention, the unit first entering into the Block state will trigger the Timeout event and then enter into the Disc state to start sending topology discovery messages to the other units; the other units will trigger the DISK_PKT event after receiving the topology discovery messages and then enter into the Disc state from the Block state, and all the rest units will enter into the Disc state in the same way. The conversion from the Block state to the Disc state can be achieved by the Timeout event or the DISC_PKT event, avoiding the topology discovery error caused by the fact that some units have entered into the Disc state while the other units are still waiting for the Timeout event.

During the process of a topology discovery, after entering into the Disc state the equipment starts sending topology discovery messages, the other equipments will also enter into the Disc state in succession, thus guaranteeing all the equipments in a stacking system can be timely found to establish a neighborhood relationship and the election of a master device, the election of a slave device and a topological calculation can be correctly completed. In this way, the influence caused by different starting times of the switching equipments in the stacking system on the topology discovery is eliminated, and the problem of election error of the master unit and the slave unit that is caused by different initialization times of different devices is solved.

Figure 5:
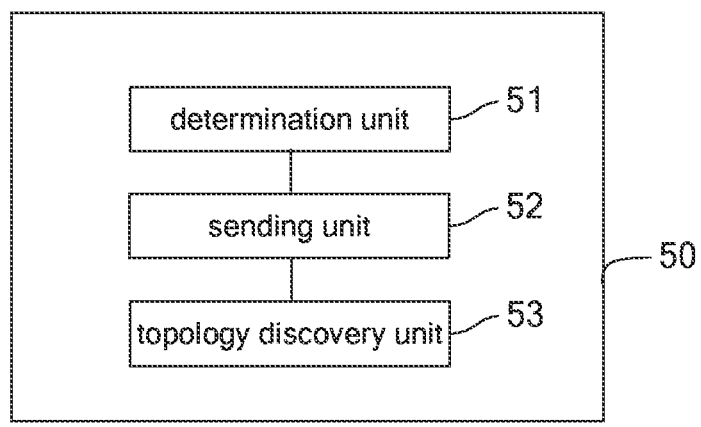
FIG. 5 is a structural schematic diagram of a switching equipment provided in the present invention.

As shown in FIG. 5, the switching equipment 50 provided in the invention comprises:

a determination unit 51, which is used for determining whether or not the switching equipment meets any one of the following two requirements, wherein the first one of the two requirements is that the current time exceeds a predetermined time, which is the time for the initialization of all the switching equipments in the stacking system, and the second one of the two requirements is that the switching equipment receives a topology discovery message from another switching equipment in the stacking system;

a sending unit 52, which is used for sending topology discovery messages to all the other switching equipments in the stacking system if any one of the two requirements is met; and a topology discovery unit 53, which is used for performing a topology discovery.

In the switching equipment, the determination unit 51 comprises:

a first determination sub-unit 511, which is used for determining whether or not the time difference between the current time and the initialization time of the switching equipment exceeds the predetermined time and generating a first determination result, wherein the predetermined time is the time for the initialization of all the switching equipments in the stacking system, and starting the sending unit if the first determination result is that the time difference between the current time and the initialization time of the switching equipment exceeds the predetermined time; and a second determination sub-unit 512, which is used for determining whether or not there is a topology discovery message received from another switching equipment in the stacking system if the first determination result is that the time difference between the current time and the initialization time of the switching equipment fails to exceed the predetermined time, generating a second determination result, starting the sending unit if there is a topology discovery message received from another switching equipment in the stacking system, and starting the first determination sub-unit if there is no topology discovery message received from another switching equipment in the stacking system.

Or the determination unit 51 comprises:

a second determination sub-unit 512, which is used for determining whether or not there is a topology discovery message received from another switching equipment in the stacking system, generating a second determination result, and starting the sending unit if the second determination result is that there is a topology discovery message received from another switching equipment in the stacking system; and a first determination sub-unit 511, which is used for determining whether or not the time difference between the current time and the initialization time of the switching equipment exceeds the predetermined time if the second determination result is that there is no topology discovery message received from another switching equipment in the stacking system, generating a first determination result, wherein the predetermined time is the time for the initialization of all the switching equipments in the stacking system, starting the sending unit if the first determination result is that the time difference between the current time and the initialization time of the switching equipment exceeds the predetermined time, and starting the second determination sub-unit if the first determination result is that the time difference between the current time and the initialization time of the switching equipment fails to exceed the predetermined time.

Figure 6:
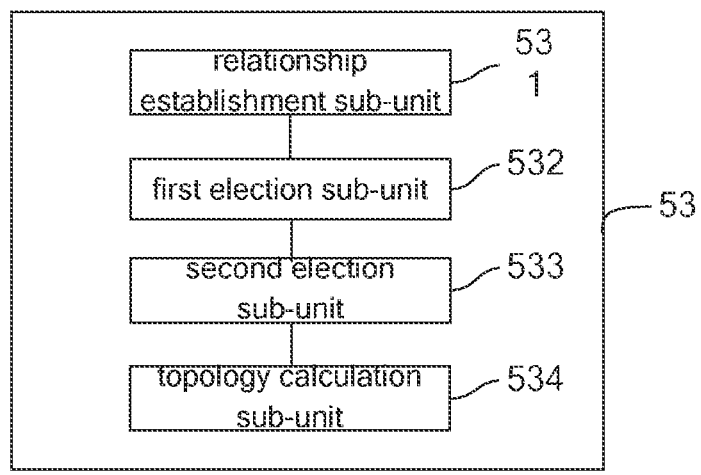
FIG. 6 is a structural schematic diagram of a topology discovery unit of a switching equipment provided in the present invention.

As shown in FIG. 6, the topology discovery unit 53 comprises:

a relationship establishment sub-unit 531, which is used for establishing a neighborhood relationship with the other switching equipments;

a first election sub-unit 532, which is used for electing a master device in the stacking system;

a second election sub-unit 533, which is used for electing a slave device in the stacking system; and a topology calculation sub-unit 534, which is used for performing a topological calculation.

In the case, The predetermined time can be set according to the time for the initialization of all the switching equipments in the stacking system. The predetermined time is longer than or as long as the time difference between the longest time for the initialization of all the switching equipments in the stacking system and the initialization time of the switching equipment. The predetermined time is ranged from 10 s to 20 s.

In the solution above, during the establishment process of topology structure, the switching equipment in the stacking system needing the shortest starting time is the one that enters into a topology discovery state first, and after entering into the topology discovery state, the switching equipment sends topology discovery messages to the other switching equipments; and the other switching equipments also enter into the topology discovery state after receiving the topology discovery messages. In this way, it is guaranteed that all the switching equipments in the stacking system can be found in time, so all the switching equipments in the system can perform topology discoveries at highly close times. Thus, the topology discovery error caused by different starting times of the switching equipments in the stacking system is avoided.

Figure 7:
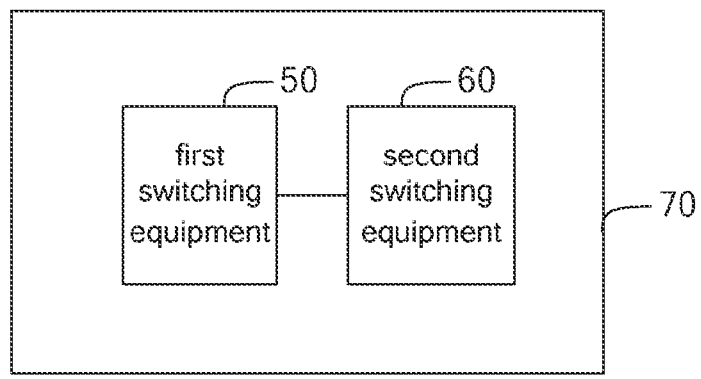
FIG. 7 is a structural schematic diagram of a stacking system provided in the present invention.

As shown in FIG. 7, the stacking system 70 provided in the invention comprises at least two switching equipments: a first switching equipment 50 and a second switching equipment 60, wherein the second switching equipment 60 has the same units with the first switching equipment 50.

The first switching equipment 50 comprises:

a determination unit 51, which is used for determining whether or not the switching equipment meets any one of the following two requirements, wherein the first one of the two requirements is that the current time exceeds a predetermined time, which is the time for the initialization of all the switching equipments in the stacking system; and the second one of the two requirements is that the switching equipment receives a topology discovery message from another switching equipment in the stacking system;

a sending unit 52, which is used for sending topology discovery messages to all the other switching equipments in the stacking system if any one of the two requirements is met; and a topology discovery unit 53, which is used for performing a topology discovery.

In the solution above, if the first switching equipment 50 is the one needing the shortest starting time in the stacking system, the switching equipment 50 enters into a topology discovery state after a predetermined time and then sends a topology discovery message to the second switching equipment 60 to enable the second switching equipment 60 to enter into the topology discovery state. If needing a long starting time, the first switching equipment 50 enters into a topology discovery state after receiving a topology discovery message from the second switching equipment 60, and then establishes topology structure with the second switching equipment 60 and elects a master device, a slave device and so on in the stacking system.

The embodiment of the method disclosed herein is corresponding to that of the equipment disclosed herein. Therefore, the part that is not described in detail in the embodiment of the method can be understood by reference to the description on a corresponding part involved in the embodiment of the equipment, and vice verse.

It should be appreciated by those skilled in this art that all or part of the steps described in the embodiments of the method can be realized by instructing related hardware with a program which may be stored in a computer-readable storage medium. When being run, the program includes the steps described in the embodiment of the method as well as the storage medium such as magnetic disc, optical disc, Read-Only Memory (ROM), Random Access Memory (RAM) and so on.

In the embodiments of the method disclosed in the invention, the sequence numbers of the steps are not to be construed as limiting the execution order of the steps. It should also be appreciated by those skilled in this art that the modifications devised in the order of the steps without making a creation also belong to the scope of the protection of the present invention.

The mentioned above is preferred embodiments of the present invention. For those skilled in the art, it should be noted that many other improvements and modifications that can devised without departing from the principle of the present invention are deemed to be within the protection scope of the present invention.

What is claimed is:

1. A method for establishing topology structure of switching equipments, comprising the steps of:
Step 1, when any one of the following two requirements is met, turning to Step 2 by a switching equipment, otherwise, executing Step 1 again by the switching equipment, wherein a first one of the two requirements is that a current time exceeds a predetermined time, which is a time for the initialization of all the switching equipments in a stacking system, and a second one of the two requirements is that one switching equipment receives a topology discovery message from another switching equipment in the stacking system;
Step 2, sending, by the switching equipment, topology discovery messages to all the other switching equipments in the stacking system; and
Step 3, performing a topology discovery by the switching equipment;
wherein Step 1 further comprises the steps of:
determining, by the switching equipment, whether or not a time difference between the current time and an initialization time of the switching equipment exceeds the predetermined time and generating a first determination result, wherein the predetermined time is the time for initialization of all the switching equipments in the stacking system;
if the first determination result is that the time difference between the current time and the initialization time of the switching equipment exceeds the predetermined time, turning to Step 2 by the switching equipment, otherwise, determining, by the switching equipment, whether or not there is the topology discovery message received from another switching equipment in the stacking system and generating a second determination result;
if the second determination result is that there is the topology discovery message received from another switching equipment in the stacking system, turning to Step 2 by the switching equipment, otherwise, executing Step 1 again by the switching equipment; or
Step 1 further comprises the steps of:
determining, by the switching equipment, whether or not there is the topology discovery message received from another switching equipment in the stacking system and generating the second determination result;
if the second determination result is that there is the topology discovery message received from another switching equipment in the stacking system, turning to Step 2 by the switching equipment, otherwise, determining, by the switching equipment, whether or not the time difference between the current time and the initialization time of the switching equipment exceeds the predetermined time and generates the first determination result, wherein the predetermined time is the time for initialization of all the switching equipments in the stacking system;
if the first determination result is that the time difference between the current time and the initialization time of the switching equipment exceeds the predetermined time, turning to Step 2 by the switching equipment, otherwise, executing Step 1 again by the switching equipment.

2. The method for establishing topology structure of switching equipments according to claim 1, wherein Step 3 comprises the steps of:
establishing, by the switching equipment, a neighborhood relationship with other switching equipments;
electing, by the switching equipment, a master device in the stacking system;
electing, by the switching equipment, a slave device in the stacking system; and
performing, by the switching equipment, a topological calculation.

3. The method for establishing topology structure of switching equipments according to claim 1, wherein the predetermined time is longer than or as long as the time difference between the longest time for the initialization of all the switching equipments in the stacking system and the initialization time of the switching equipment.

4. The method for establishing topology structure of switching equipments according to claim 1, wherein the predetermined time is ranged from 10 s to 20 s.

5. A switching equipment, comprising:
a determination unit, which is used for determining whether or not the switching equipment meets any one of the following two requirements, wherein a first one of the two requirements is that a current time exceeds a predetermined time, which is a time for initialization of all switching equipments in a stacking system, and a second one of the two requirements is that the switching equipment receives a topology discovery message from another switching equipment in the stacking system;
a sending unit, which is used for sending topology discovery messages to all the other switching equipments in the stacking system if any one of the two requirements is met; and
a topology discovery unit, which is used for performing a topology discovery;
wherein the determination unit comprises:
a first determination sub-unit, which is used for determining whether or not a time difference between the current time and an initialization time of the switching equipment exceeds the predetermined time and generating a first determination result, wherein the predetermined time is the time for initialization of all the switching equipments in the stacking system, and starting the sending unit if the first determination result is that the time difference between the current time and the initialization time of the switching equipment exceeds the predetermined time; and
a second determination sub-unit, which is used for determining whether or not there is the topology discovery message received from another switching equipment in the stacking system if the first determination result is that the time difference between the current time and the initialization time of the switching equipment fails to exceed the predetermined time, generating a second determination result, starting the sending unit if there is the topology discovery message received from another switching equipment in the stacking system, and starting the first determination sub-unit if there is no topology discovery message received from another switching equipment in the stacking system; or the determination unit comprises:

a third determination sub-unit, which is used for determining whether or not there is the topology discovery message received from another switching equipment in the stacking system, generating the second determination result, and starting the sending unit if the second determination result is that there is the topology discovery message received from another switching equipment in the stacking system; and a fourth determination sub-unit, which is used for determining whether or not the time difference between the current time and the initialization time of the switching equipment exceeds the predetermined time if the second determination result is that there is no topology discovery message received from another switching equipment in the stacking system, generating the first determination result, wherein the predetermined time is the time for initialization of all the switching equipments in the stacking system, starting the sending unit if the first determination result is that the time difference between the current time and the initialization time of the switching equipment exceeds the predetermined time, and starting the third determination sub-unit if the first determination result is that the time difference between the current time and the initialization time of the switching equipment fails to exceed the predetermined time.

6. The switching equipment according to claim 5, wherein the predetermined time is longer than or as long as the time difference between the longest time for the initialization of all the switching equipments in the stacking system and the initialization time of the switching equipment.

7. A stacking system comprising at least two switching equipments, wherein a switching equipment comprises:

a determination unit, which is used for determining whether or not the switching equipment meets any one of the following two requirements, wherein a first one of the two requirements is that a current time exceeds a predetermined time, which is a time for initialization of all the switching equipments in the stacking system; and a second one of the two requirements is that the switching equipment receives a topology discovery message from another switching equipment in the stacking system;

a sending unit, which is used for sending topology discovery messages to all the other switching equipments in the stacking system if any one of the two requirements is met; and a topology discovery unit, which is used for performing a topology discovery;

wherein the determination unit comprises:

a first determination sub-unit, which is used for determining whether or not a time difference between the current time and an initialization time of the switching equipment exceeds the predetermined time and generating a first determination result, wherein the predetermined time is the time for initialization of all the switching equipments in the stacking system, and starting the sending unit if the first determination result is that the time difference between the current time and the initialization time of the switching equipment exceeds the predetermined time; and a second determination sub-unit, which is used for determining whether or not there is the topology discovery message received from another switching equipment in the stacking system if the first determination result is that the time difference between the current time and the initialization time of the switching equipment fails to exceed the predetermined time, generating a second determination result, starting the sending unit if there is the topology discovery message received from another switching equipment in the stacking system, and starting the first determination sub-unit if there is no topology discovery message received from another switching equipment in the stacking system; or the determination unit comprises:

a third determination sub-unit, which is used for determining whether or not there is the topology discovery message received from another switching equipment in the stacking system, generating the second determination result, and starting the sending unit if the second determination result is that there is the topology discovery message received from another switching equipment in the stacking system; and a fourth determination sub-unit, which is used for determining whether or not the time difference between the current time and the initialization time of the switching equipment exceeds the predetermined time if the second determination result is that there is no topology discovery message received from another switching equipment in the stacking system, generating the first determination result, wherein the predetermined time is the time for initialization of all the switching equipments in the stacking system, starting the sending unit if the first determination result is that the time difference between the current time and the initialization time of the switching equipment exceeds the predetermined time, and starting the third determination sub-unit if the first determination result is that the time difference between the current time and the initialization time of the switching equipment fails to exceed the predetermined time.

* * * * *